United States Patent [19]

Ishii

[11] Patent Number: 5,348,600
[45] Date of Patent: Sep. 20, 1994

[54] METHOD AND APPARATUS FOR FORMING A CYLINDRICAL MEMBER

[75] Inventor: Ryutaro Ishii, Tokyo, Japan

[73] Assignee: Bridgestone Corporation, Tokyo, Japan

[21] Appl. No.: 170,631

[22] Filed: Dec. 21, 1993

Related U.S. Application Data

[63] Continuation of Ser. No. 30,872, Mar. 12, 1993, abandoned.

[30] Foreign Application Priority Data

Mar. 17, 1992 [JP] Japan ................... 4-091676

[51] Int. Cl.⁵ ............................................. B29D 30/26
[52] U.S. Cl. .................... 156/134; 156/304.1; 156/405.1; 156/447; 156/502
[58] Field of Search ............... 156/134, 304.1, 304.2, 156/137, 157, 304.5, 122, 544, 502, 414, 405.1, 447

[56] References Cited

U.S. PATENT DOCUMENTS

| | | | |
|---|---|---|---|
| 2,688,996 | 9/1954 | Loomis | 156/134 |
| 3,408,244 | 10/1968 | Frazier | 156/403 |
| 3,994,767 | 11/1976 | Smith | . |
| 4,765,862 | 8/1988 | Azuma | 156/304.1 |
| 4,793,890 | 12/1988 | Sato | 156/304.1 |
| 5,073,226 | 12/1991 | Suzuki et al. | . |

FOREIGN PATENT DOCUMENTS

| | | |
|---|---|---|
| 0253067 | 1/1988 | European Pat. Off. |
| 0417991 | 3/1991 | European Pat. Off. |
| 1472774 | 3/1966 | France |
| 61-8770 | 3/1986 | Japan |
| 3-97532 | 4/1991 | Japan |

OTHER PUBLICATIONS

Patent Abstracts of Japan, vol. 9, No. 223 (M-411) (1946) Sep. 10, 1985.

*Primary Examiner*—Geoffrey L. Knable
*Attorney, Agent, or Firm*—Sughrue, Mion, Zinn, Macpeak & Seas

[57] ABSTRACT

A method of forming a cylindrical member includes the steps of: attaching an auxiliary bar having a shape of a substantially triangular prism to a forming drum; supplying a belt-shaped member cut to a predetermined length toward the forming drum and causing a leading end of the belt-shaped member to be attached to one of side surfaces of the auxiliary bar; supplying the belt-shaped member onto the forming drum while the forming drum is being rotated so as to wind the belt-shaped member around the forming drum, and attaching a trailing end of the belt-shaped member to another side surface of the auxiliary bar; separating the leading end and the trailing end of the belt-shaped member from the auxiliary bar; removing the auxiliary bar off the forming drum; and causing the leading and the trailing end of the belt-shaped member to butt against each other on the forming drum. Also provided is an apparatus for forming a cylindrical member.

20 Claims, 9 Drawing Sheets

METHOD AND APPARATUS FOR FORMING A CYLINDRICAL MEMBER

This is a continuation of application No. 08/030,872 filed Mar. 12, 1993 now abandoned.

BACKGROUND OF THE INVENTION

1. Field of the Invention

The present invention relates to a method and apparatus for forming a cylindrical member by winding a belt-shaped member around an outer periphery of a forming drum and by causing leading and trailing ends thereof to butt against each other.

2. Description of the Related Art

As a conventional method and apparatus for forming a cylindrical member, for example, one disclosed in Japanese Patent Application Laid-Open No. 97532/1991 is known. This apparatus includes: a forming drum having a cylindrical unit formed with a slit extending substantially in an axial direction of the cylindrical unit and around which a belt-shaped member is wound wherein a slight clearance between both ends of the belt-shaped member is aligned with the slit; a first joining unit arranged in the forming drum in face-to-face relation with the slit; and a second joining unit arranged on an outer side of the forming drum and movable toward and away from the first joining unit., wherein the second joining unit in cooperation with the first joining unit pulls closer together and butt joins the ends of the belt-shaped member wound around the forming drum when the ends of the belt-shaped member are aligned with the slit.

With the above-described conventional method and apparatus for forming a cylindrical member, no problem is presented when only one belt-shaped member is wound directly around the forming drum. However, if an attempt is made to join the ends of another belt-shaped member by winding it around a belt-shaped member already wound around the forming drum, portions of the lower belt-shaped member already wound, together with the upper belt-shaped member, are pulled closer by the first and second joining units, so that the formation of such a cylindrical member cannot be effected.

SUMMARY OF THE INVENTION

Accordingly, it is an object of the present invention to provide a method and apparatus for forming a cylindrical member which make it possible to not only wind the belt-shaped member around the forming drum and butt join the ends thereof but also wind another belt-shaped member around the forming drum around which a belt-shaped member is already wound and but join its ends.

The above object of the present invention is attained by the following method and apparatus for forming a cylindrical member.

In accordance with one aspect of the present invention, there is provided a method of forming a cylindrical member, comprising the steps of: attaching an auxiliary bar having a shape of a substantially triangular prism to a forming drum in such a manner that the auxiliary bar becomes parallel with an axis of the forming drum; supplying a belt-shaped member cut to a predetermined length toward the forming drum in such a manner as to cause a leading end of the belt-shaped member to be attached to one of side surfaces of the auxiliary bar; supplying the belt-shaped member onto the forming drum while the forming drum is being rotated so as to wind the belt-shaped member around the forming drum, and attaching a trailing end of the belt-shaped member to another side surface of the auxiliary bar; separating the leading end and the trailing end of the belt-shaped member from the auxiliary bar; removing the auxiliary bar off the forming drum; and causing the leading end and the trailing end of the belt-shaped member to butt against each other on the forming drum.

In the present invention, since the leading end and the trailing end of the belt-shaped member are attached to side surfaces of the auxiliary bar having the shape of a substantially triangular prism, the gripping of the ends of the belt-shaped member can be facilitated.

In accordance with another aspect of the present invention, there is provided an apparatus for forming a cylindrical member, comprising: a forming drum for forming a belt-shaped member cut to a predetermined length by winding the belt-shaped member therearound; an auxiliary bar having a shape of a substantially triangular prism and capable of being attached to or removed from the forming drum in parallel with an axis of the forming drum; transfer means for transferring the auxiliary bar to and away from a surface of the forming drum; belt-shaped member supplying means for supplying the belt-shaped member toward the forming drum with the auxiliary bar attached thereto to cause a leading end of the belt-shaped member to be attached to one of side surfaces of the auxiliary bar, and for further supplying the belt-shaped member onto the forming drum being rotated to cause the belt-shaped member to be wound around the forming drum and to cause a trailing end of the belt-shaped member to be attached to another side surface of the auxiliary bar; belt-shaped member gripping means for holding and releasing the leading end and the trailing end of the belt-shaped member attached to the auxiliary bar; and moving means for moving the belt-shaped member gripping means in such a manner as to move the leading end and the trailing end of the belt-shaped member away from the auxiliary bar and to cause the leading end and the trailing end to butt against each other after the auxiliary bar is removed from the forming drum.

In one form of the present invention, the belt-shaped member gripping means includes a plurality of leading-end gripping pawls and trailing-end gripping pawls for respectively gripping the leading end and the trailing end of the belt-shaped member, and the leading-end gripping pawls and the trailing-end gripping pawls are arranged alternately along the axis of the forming drum. Furthermore, the leading-end gripping pawls and the trailing-end gripping pawls are each provided with an upper pawl and a lower pawl which oppose each other, and an upper pawl moving mechanism for gripping the end of the belt-shaped member between the upper pawl and the lower pawl by causing the upper pawl to approach the lower pawl. In addition, grooves each extending in a longitudinal direction of the belt-shaped member and into which the lower pawls of the leading-end gripping pawls and the trailing-end gripping pawls can be inserted are formed on two side surfaces of the auxiliary bar to which the belt-shaped member is to be attached. As a result, the gripping of the belt-shaped member by the upper pawls and the lower pawls is facilitated.

Preferably, a roller may be provided which is capable of rolling on joining portions of the leading end and the trailing end of the belt-shaped member made to butt against each other.

The above and other objects and features of the invention will more fully appear from the following detailed description when read in conjunction with the accompanying drawings. It is to be expressly understood, however, that the drawings are for purpose of illustration only and are not intended as a definition of the limits of the invention.

DESCRIPTION OF THE PREFERRED EMBODIMENT

Figure 1:
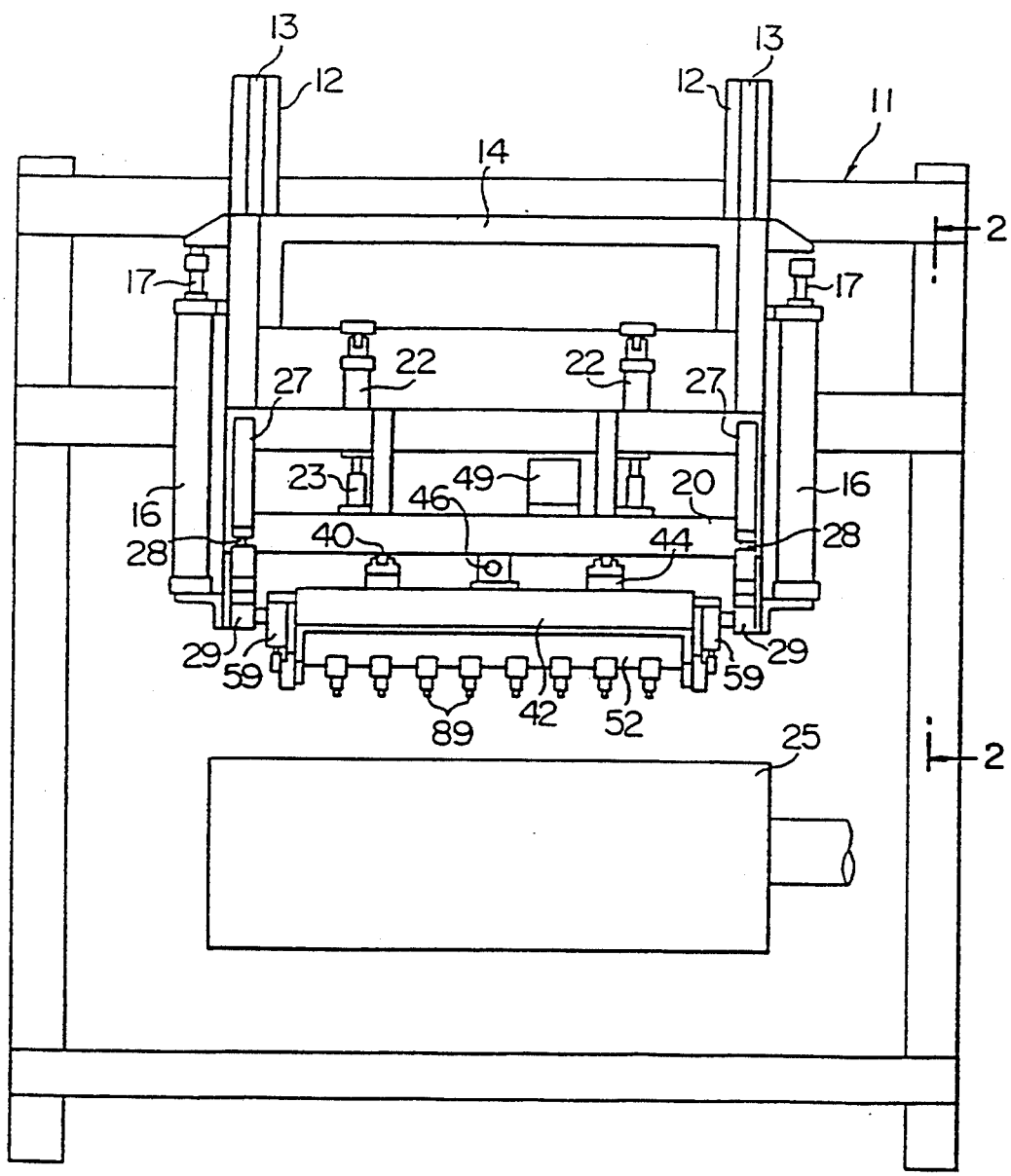
FIG. 1 is a front elevational view illustrating an embodiment of a forming apparatus in accordance with the present invention.
Figure 2:
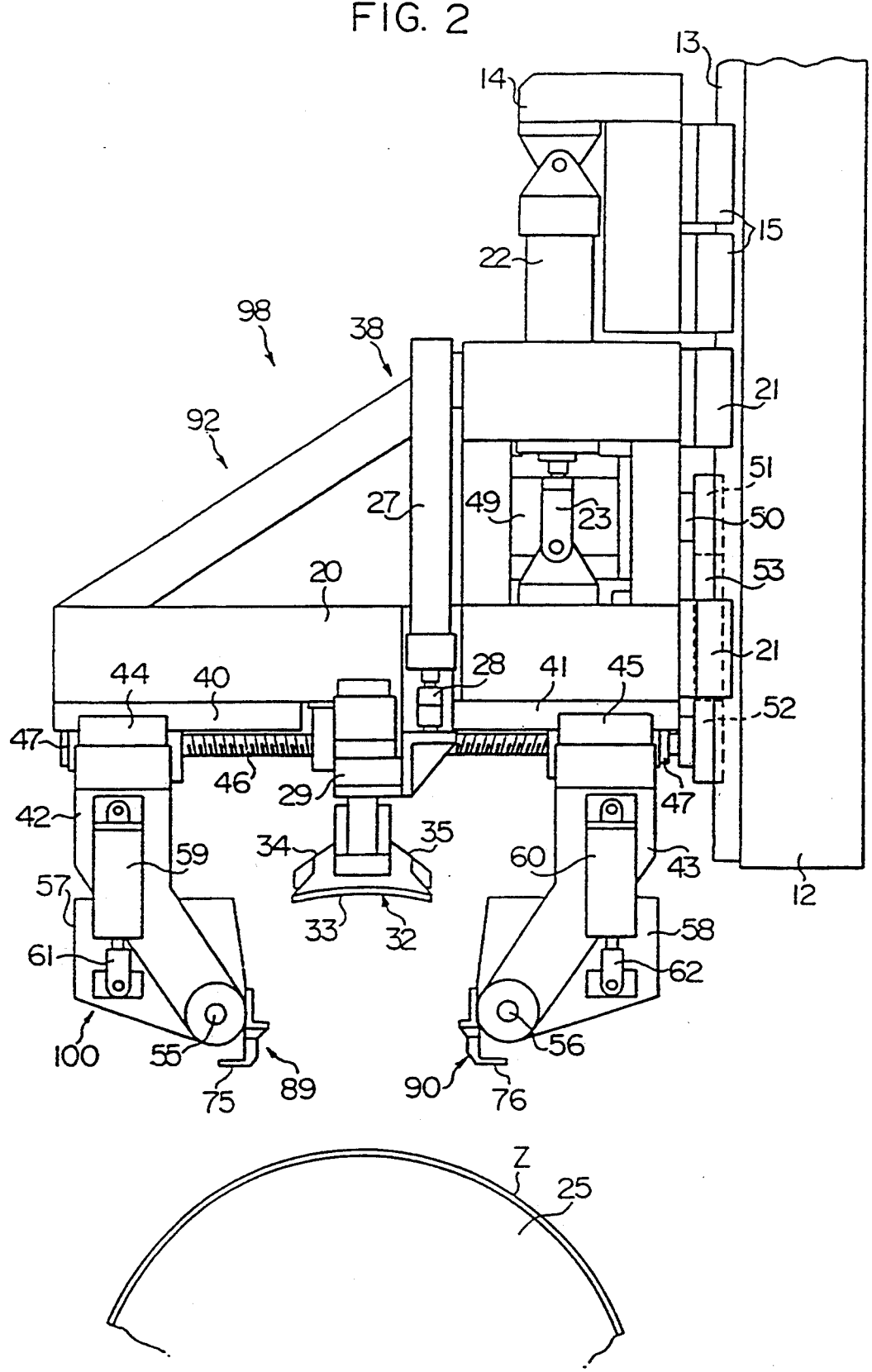
FIG. 2 is a side elevational view of the forming apparatus taken along line 2—2 in FIG. 1.

As shown in FIGS. 1 and 2, the apparatus in this embodiment is mainly comprised of a forming drum 25, an auxiliary bar 32 extending above the forming drum and in parallel with the axis of the forming drum, a transfer unit 38 for vertically transferring the auxiliary bar 32 toward and away from the forming drum, and a moving unit 92 for moving pawls 89 and 90 used to grip a belt-shaped member. The transfer unit 38 and the moving unit 92 are supported by a pair of vertical beams 12 mounted on a frame 11. Slide bearings 15 secured to a lifting frame 14 are slidably engaged on a pair of vertically extending guide rails 13 laid on the vertical beams 12, respectively. A pair of cylinders 16 are fixed to the respective vertical beams 12 and extend vertically, and distal ends of piston rods 17 of these cylinders 16 are coupled to the lifting frame 14. As a result, this lifting frame 14 is lifted or lowered while being guided by the guide rails 13 as the cylinders 16 are actuated. Slide bearings 21 which are slidably engaged on the guide rails 13 are mounted on a movable frame 20. Coupled to this movable frame 20 are distal ends of piston rods 23 of a pair of vertical cylinders 22 which are, in turn, coupled to the lifting frame 14. As a result, this movable frame 20 is raised or lowered while being guided by the guide rails 13 as the cylinders 22 are actuated.

The forming drum 25, which is rotatable and capable of enlarging or reducing its diameter, is disposed immediately below this movable frame 20. The cylindrical member is formed as a belt-shaped member B cut in advance to a predetermined length, e.g., a rubber sheet with steel cords embedded therein, is wound around the outer periphery of this forming drum 25. A pair of vertical cylinders 27 are mounted on the movable frame 20, a gripper 29 being secured to a distal end of a piston rod 28 of each of these cylinders 27. An auxiliary bar 32 extends in parallel with the axis of rotation of the forming drum 25. This auxiliary bar 32 is substantially shaped like a triangular prism. A bottom surface 33 of the auxiliary bar 32, which opposes the forming drum 25, is formed with an arcuate surface having the same diameter as that of the outer surface of the forming drum 25. In addition, a plurality of insertion grooves 36 and 37 extending in the transverse direction are respectively formed on the remaining two side surfaces 34 and 35 of this auxiliary bar 32. These insertion grooves 36 and 37 are arranged alternately at predetermined intervals in the longitudinal direction of the auxiliary bar 32 (see FIGS. 3, 4 and 9). In addition, a demagnetizable magnetically attracting tool, e.g., an attracting tool incorporating an electromagnet or a permanent magnet whose magnetic flux can be shielded, is incorporated in the auxiliary bar 32. As a result, when the auxiliary bar 32 is moved to the forming drum 25, this auxiliary bar 32 can be attracted and attached to the forming drum 25. The aforementioned grippers 29 are capable of gripping or releasing longitudinal opposite ends of the auxiliary bar 32. The aforementioned cylinders 22 and the grippers 29 as a whole constitute the transfer unit 38 for transferring the auxiliary bar 32.

On each longitudinal side of the movable frame 20, a pair of guide rails 40 and 41 extending in the transverse direction are laid on the underside of the movable frame 20 on the front and rear sides thereof, respectively. Slide bearings 44 and 45 respectively fixed to moving bases 42 and 43 are engaged slidably on the guide rails 40 and 41. A screw shaft 46 extends along the guide rails 40 and 41, and is rotatably supported on bearings 47 which are, in turn, supported on the underside of the movable frame 20. In addition, inverse threads are formed on the outer surface of this screw shaft 46 with a longitudinal center thereof as a boundary, and its front portion is screwed in the moving base 42, while its rear portion is screwed in the moving base 43. A motor 49 is mounted on the movable frame 20, and a timing belt 53 is trained between a pulley 51 secured to an output shaft 50 of this motor 49 and a pulley 52 secured to the screw shaft 46. As a result, as the motor 49 is operated and the screw shaft 46 is thereby rotated, the moving bases 42 and 43 move an equal distance in the opposite directions while being guided by the guide rails 40 and 41 so as to move toward or away from each other.

A pair of swinging boxes 57 and 58 are swingably supported on lower ends of the moving bases 42 and 43 via pins 55 and 56 which are parallel with the axis of the forming drum 25. Vertical cylinders 59 and 60 are respectively coupled to the moving bases 42 and 43, and distal ends of piston rods 61 and 62 of these cylinders 59 and 60 are respectively coupled to the swinging boxes 57 and 58. As a result, as the cylinders 59 and 60 are actuated, the swinging boxes 57 and 58 are swung about the pins 55 and 56.

Figure 3:
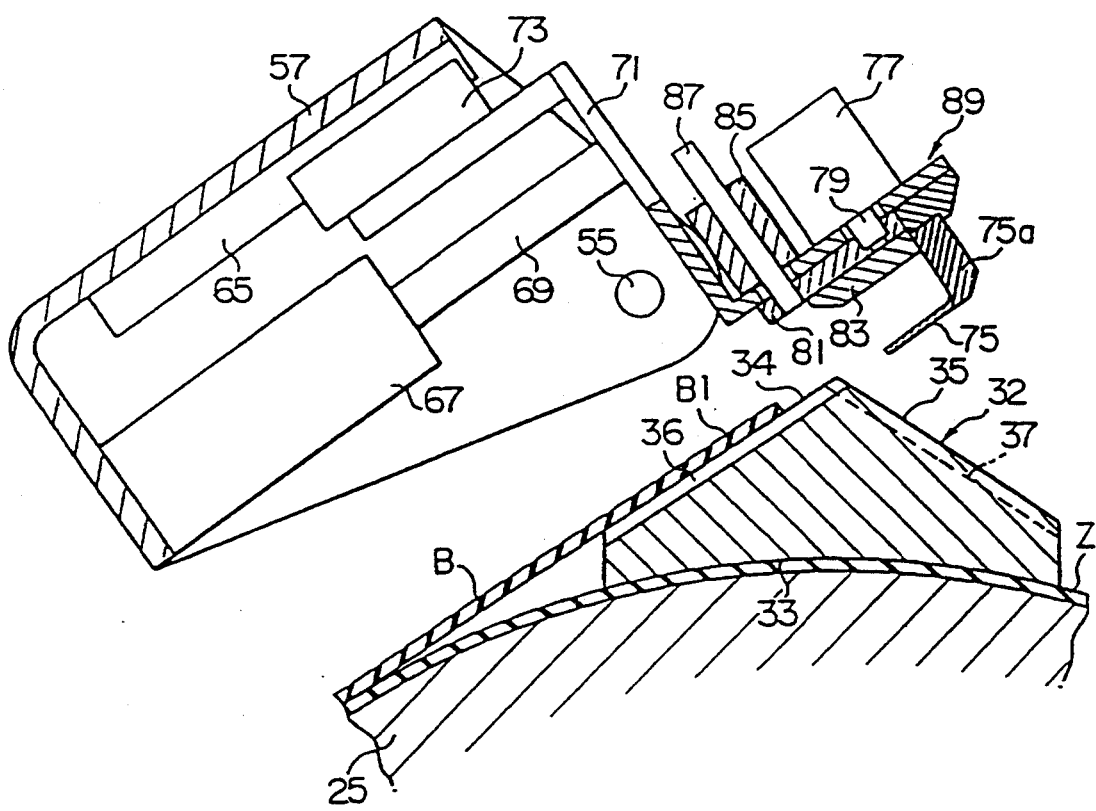
FIG. 3 is a fragmentary side elevational view of a leading-end gripping pawl and its vicinity.
Figure 4:
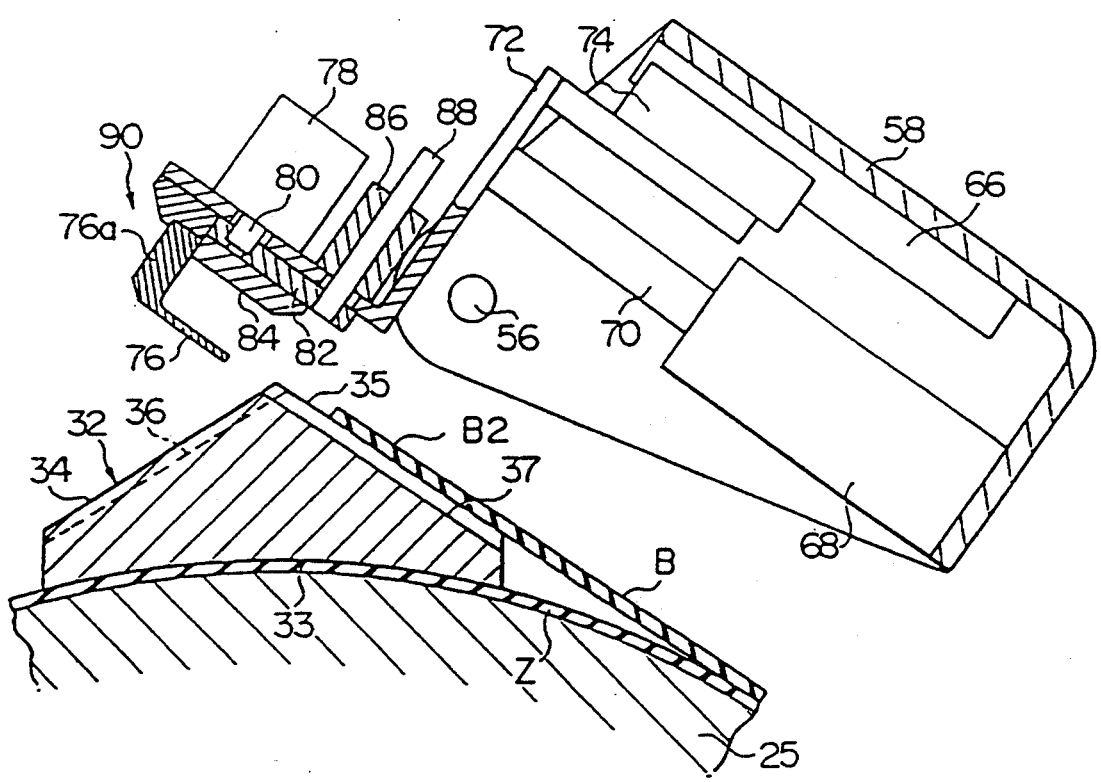
FIG. 4 is a fragmentary side elevational view of a trailing-end gripping pawl and its vicinity.

In FIGS. 3 and 4, a plurality of guide rails 65 and 66 extending substantially in the transverse direction are respectively laid in the swinging boxes 57 and 58. These guide rails 65 and 66 are arranged alternately at predetermined distances in the axial direction of the forming drum 25, i.e., such that each guide rail 66 is located between adjacent ones of the guide rails 65. Pneumatic cylinders 67 and 68 are respectively mounted in the swinging boxes 57 and 58 immediately below the guide rails 65 and 66, and are disposed in parallel with the guide rails 65 and 66. Movable bases 71 and 72 are respectively fixed to distal ends of piston rods 69 and 70 of these cylinders 67 and 68. Slide bearings 73 and 74 slidably engaged on the guide rails 65 and 66 are respectively mounted on the movable bases 71 and 72, while lower pawls 75 and 76 having an L-shaped cross section are affixed to the distal ends of the movable bases 71 and 72. Cylinders 77 and 78, which serve as an opening and closing mechanism, are mounted on the movable bases 71 and 72 located immediately above the lower pawls 75 and 76. Coupling members 81 and 82 and upper pawls 83 and 84, which form pairs with the lower pawls 75 and 76, are respectively mounted on distal ends of piston rods 79 and 80 of these cylinders 77 and 78. A plurality of guides 85 and 86 are respectively secured to the movable bases 71 and 72, and guide rods 87 and 88 secured to the coupling members 81 and 82 are slidably inserted in these guides 85 and 86. As the cylinders 77 and 78 are actuated, the upper pawls 83 and 84 move while being supported by the guide rods 87 and 88 which slide in the guides 85 and 86, thereby allowing the distance between the lower pawl 75 or 76 and the upper pawl 83 or 84 to be reduced or enlarged. Consequently, the belt-shaped member B can be gripped by or released from the lower pawls 75 and 76 and the upper pawls 83 and 84. These lower and upper pawls 75 and 83 constitute the leading-end gripping pawls 89 which are capable of gripping a leading end B1 of the belt-shaped member B, while the lower and upper paws 76 and 84 as a whole constitute the trailing-end gripping pawls 90 which are capable of gripping a trailing end B2 of the belt-shaped member B. Furthermore, the movable frame 20, cylinders 22, moving bases 42 and 43, screw shaft 46, motor 49, timing belt 53, swinging boxes 57 and 58, cylinders 50 and 60, cylinders 67 and 68, and movable bases 71 and 72, which are shown in FIG. 2, as a whole constitute the moving unit 92 for allowing the leading-end gripping pawls 89 and the trailing-end gripping pawls 90 to move toward or away from the forming drum 25 and the auxiliary bar 32.

Figure 5:
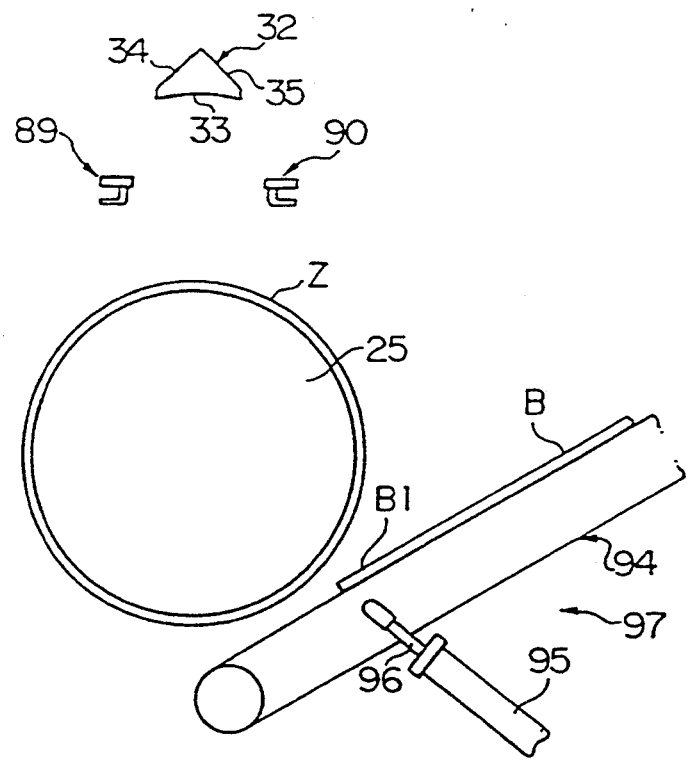
FIG. 5 is a schematic side elevational view illustrating the positional relationship among an auxiliary bar, a forming drum, and a belt-shaped member supplying means.

In FIG. 5, an inclined conveyor 94 is disposed in the rear of the forming drum 25, and transports the belt-shaped member B toward the forming drum 25 so as to allow the belt-shaped member B to be deposited on the forming drum 25 or the auxiliary bar 32 attached to the forming drum 25. A distal end of a piston rod 96 of a cylinder 95 is coupled to this conveyor 94. As a result, the conveyor 94 swings vertically as the cylinder 95 is actuated. The aforementioned conveyor 94 and cylinder 95 as a whole constitute a belt-shaped member supplying unit 97 for supplying the belt-shaped member B cut to a predetermined length toward the forming drum 25 and allowing its leading end B1 to be attached to one of the two sides of the auxiliary bar 32 other than its bottom surface 33 (in the illustrated case, to the side surface 34), for further supplying the belt-shaped member B to the forming drum 25 being rotated, and allowing the belt-shaped member B to be wound around the outer surface of the forming drum 25, specifically around the outer surface of a belt-shaped member Z already wound around the forming drum 25, and for allowing the trailing end B2 of the belt-shaped member B to be attached to the remaining side of the auxiliary bar 32 (in the illustrated case, to the side surface 35). The aforementioned auxiliary bar 32, transfer unit 38, belt-shaped member supplying unit 97 as a whole constitute a winding unit (see FIG. 2).

Figure 13:
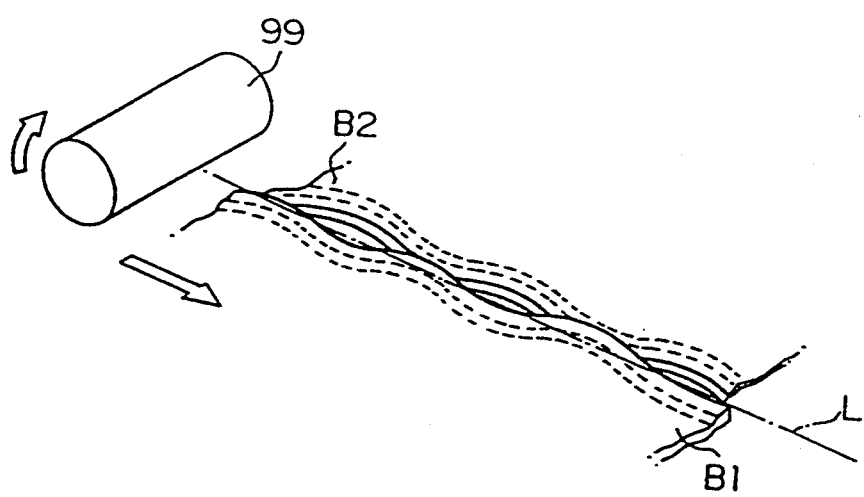
FIG. 13 is a perspective view illustrating a process for joining the leading and trailing ends of the belt-shaped member.

In FIG. 13, a joining roller 99 is capable of rolling on the outer surface of the forming drum 25 in parallel with the axis of the forming drum 25. After the belt-shaped member B is wound around the forming drum 25, this joining roller 99 presses the leading end B1 and trailing end B2 of the belt-shaped member B against the forming drum 25 to join the leading and trailing ends of the belt-shaped member B while rolling along a butt line L between the leading and trailing ends of the belt-shaped member B. The aforementioned leading-end gripping pawls 89, trailing-end gripping pawls 90, moving unit 92, and joining roller 99 as a whole constitute a joining unit 100 (see FIG. 2).

The operation of this embodiment of the present invention will be described hereafter.

It is now assumed that, as shown in FIG. 5, the belt-shaped member Z has already been wound around the forming drum 25, and its both ends have been butt joined. In addition, the belt-shaped member B cut to a predetermined length is placed on the conveyor 94. At this time, the auxiliary bar 32 and the leading- and trailing-end gripping pawls 89 and 90 remain on standby at a standby position above the forming drum 25.

Figure 6:
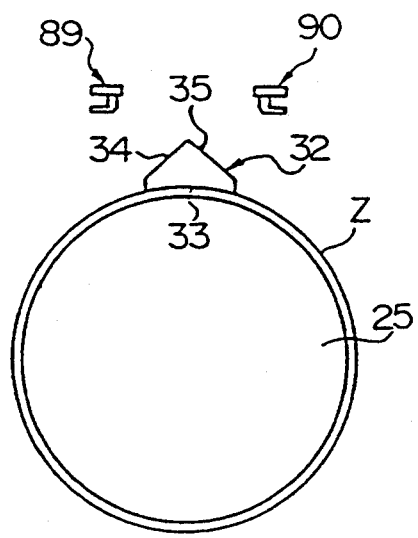
FIG. 6 is a schematic side elevational view illustrating a state in which the auxiliary bar is attached to the forming drum.

Then, if the cylinders 27 of the transfer unit 38 shown in FIG. 2 are actuated to project their piston rods 28, the grippers 29 are lowered to approach the forming drum 25, and the auxiliary bar 32 held by the grippers 29 is moved toward the forming drum 25. When the bottom surface 33 of this auxiliary bar 32 reaches a predetermined position on the outer surface of the forming drum 25 via the belt-shaped member Z, the operation of the cylinders 27 is stopped. At this time, the auxiliary bar 32 is attracted to the forming drum 25 by a magnetic force of the permanent magnet or the electromagnet, so that the auxiliary bar 32 is attached to the forming drum 25 at a predetermined position thereof. Then, after the auxiliary bar 32 is released from the grippers 29, the cylinders 27 are actuated, and their piston rods 28 are retracted, allowing the grippers 29 to be raised and return to their initial position. This state is shown in FIG. 6.

Figure 7:
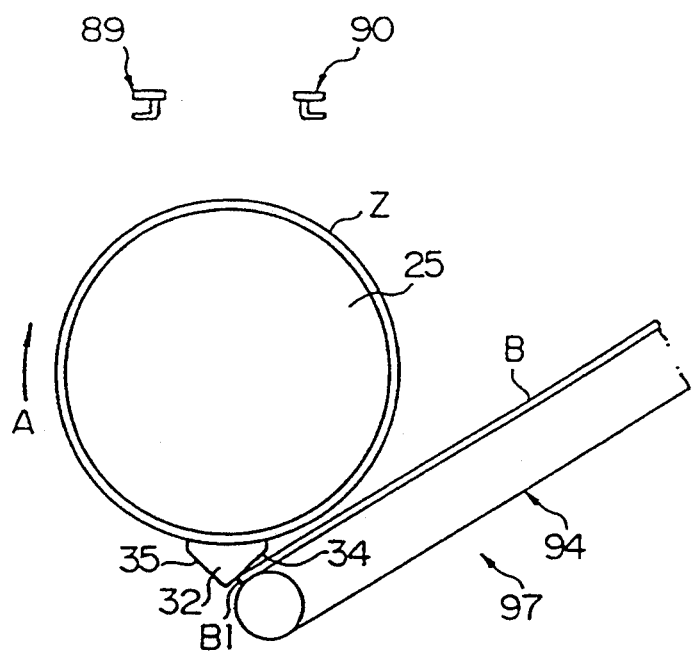
FIG. 7 is a schematic side elevational view illustrating a manner in which the belt-shaped member is supplied to the forming drum.

Then, the forming drum 25 undergoes a substantially half rotation until the auxiliary bar 32 reaches the lower side of the forming drum 25. In this state, the cylinders 95 are actuated to project their piston rods 96, and the distal end of the conveyor 94 approaches the auxiliary bar 32, and the conveyor 94, which together with the cylinder 95 constitutes the belt-shaped member supplying unit 97, is operated, allowing the belt-shaped member B to be supplied toward the forming drum 25, specifically toward the auxiliary bar 32. As a result, the leading end B1 of the belt-shaped member B is pressed against the side surface 34 of the auxiliary bar 32, as shown in FIG. 7. Consequently, the leading end B1 is attached to the side surface 34 of the auxiliary bar 32 by means of the attractive force of the auxiliary bar 32 and the adhesiveness of the belt-shaped member B.

Figure 8:
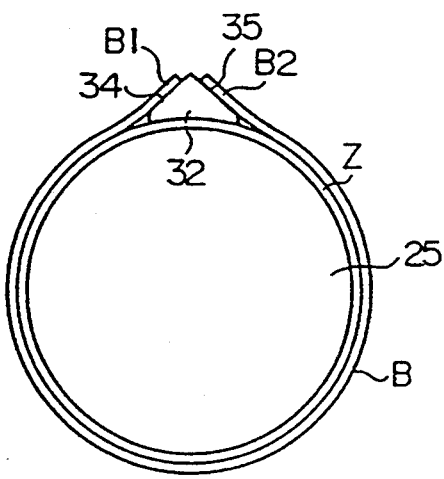
FIG. 8 is a schematic side elevational view illustrating a state in which the belt-shaped member is wound around the forming drum.

Subsequently, while the forming drum 25 is being rotated in the direction of arrow A, the belt-shaped member B is supplied onto the forming drum 25 by means of the conveyor 94 at the same speed as the peripheral speed of the forming drum 25, specifically the peripheral speed of the belt-shaped member Z. As a result, a major portion of the belt-shaped member B is wound around the outer side of the forming drum 25. When the trailing end B2 of the belt-shaped member B is brought into contact with the side surface 35 of the auxiliary bar 32, this trailing end B2 is also attached to the side surface 35 of the auxiliary bar 32 in the same way as the leading end B1. In this manner, both the leading end B1 and trailing end B2 of the belt-shaped member B are attached to the side surfaces 34 and 35 of the auxiliary bar 32, respectively. In addition, when the portion of the belt-shaped member B between them is wound around the outer side of the forming drum 25, the cylinder 95 is actuated to move the conveyor 94 away from the forming drum 25, while the forming drum 25 rotates until the auxiliary bar 32 reaches the upper side of the forming drum 25, as shown in FIG. 8.

Figure 9:
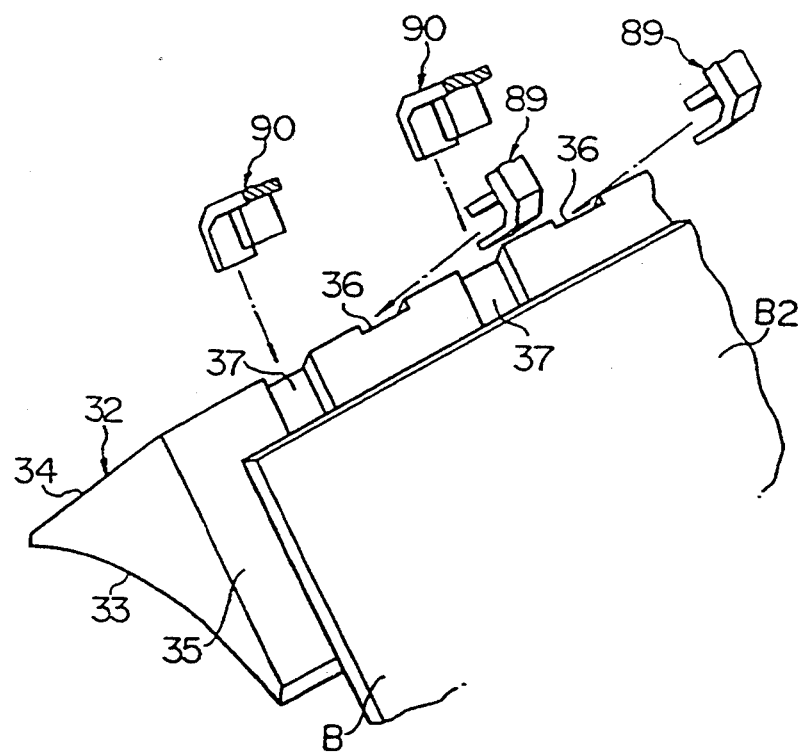
FIG. 9 is a schematic side elevational view illustrating a manner in which the pawls grip the belt-shaped member on the auxiliary bar.

Next, by operating the motor 49 of the moving unit 92 to rotate the screw shaft 46, the moving bases 42 and 43 are made to approach each other until the leading- and trailing-end gripping pawls 89 and 90 are made to alternately enter each other. Concurrently, the piston rods 61 and 62 of the cylinders 59 and 60 are projected to swing the swinging boxes 57 and 58 about the pins 55 and 56, respectively, until the leading- and trailing-end Gripping pawls 89 and 90 become parallel with the side surfaces 34 and 35 of the auxiliary bar 32, as shown in FIGS. 3 and 4. Then, since the piston rods 23 of the cylinders 22 project, the movable frame 20 is lowered while being guided by the guide rails 13 until the lower pawls 75 and 76 of the leading- and trailing-end gripping pawls 89 and 90 reach extensions of the insertion grooves 36 and 37 in the auxiliary bar 32. This state is shown in FIG. 9.

Next, as the cylinders 67 and 68 are actuated to retract their piston rods 69 and 70, the movable bases 71 and 72 are retracted while being guided by the guide rails 65 and 66, and the lower pawls 75 and 76 of the leading- and trailing-end gripping pawls 89 and 90 are inserted into the insertion grooves 36 and 37, i.e., between the leading end B1 of the belt-shaped member B and the side surface 34 of the auxiliary bar 32 and between the trailing end B2 of the belt-shaped member B and the side surface 35 of the auxiliary bar 32. The movement of these leading- and trailing-end gripping pawls 89 and 90 stops when vertical portions 75a and 76a of the lower pawls 75 and 76 abut against the leading and trailing ends of the belt-shaped member B. For this reason, in a case where the leading and trailing ends of the belt-shaped member B are slightly bent, the stopping positions of these leading- and trailing-end gripping pawls 89 and 90 slightly vary, respectively. Then, the cylinders 77 and 78 are actuated and their piston rods 79 and 80 are thereby projected to allow the upper pawls 83 and 84 to approach the lower pawls 75 and 76, and the leading- and trailing-end gripping pawls 89 and 90 are respectively closed. Consequently, the leading end B1 of the belt-shaped member B attached to the side surface 34 of the auxiliary bar 32 is gripped by the leading-end gripping pawls 89, while the trailing end B2 of the belt-shaped member B attached to the side surface 35 of the auxiliary bar 32 is gripped by the trailing-end gripping pawls 90. Here, since the leading end B1 and trailing end B2 of the belt-shaped member B are respectively attached to the two side surfaces 34 and 35 of the auxiliary bar 32 having the shape of a substantially triangular prism, these portions of the belt-shaped member B can be readily gripped by the leading- and trailing-end gripping pawls 89 and 90.

Then, the motor 49 of the moving unit 92 is operated to rotate the screw shaft 46, thereby allowing the moving bases 42 and 43 to move away from each other. As a result, the leading- and trailing-end gripping pawls 89 and 90 are moved away from the auxiliary bar 32, so that the leading end B1 and trailing end B2 of the belt-shaped member B which were gripped by the leading- and trailing-end gripping pawls 89 and 90 are respectively separated from the side surfaces 34 and 35 of the auxiliary bar 32. At the same time, since the piston rods 23 of the cylinders 22 are retracted, the movable frame 20 and the leading- and trailing-end gripping pawls 89 and 90 are raised, and the piston rods 61 and 62 of the cylinders 59 and 60 are retracted. Hence, the swinging boxes 57 and 58 are swung until the leading- and trailing-end gripping pawls 89 and 90 become horizontal. At this time, the cylinders 67 and 68 are actuated to allow their piston rods 69 and 70 to project up to stroke ends thereof.

Figure 10:
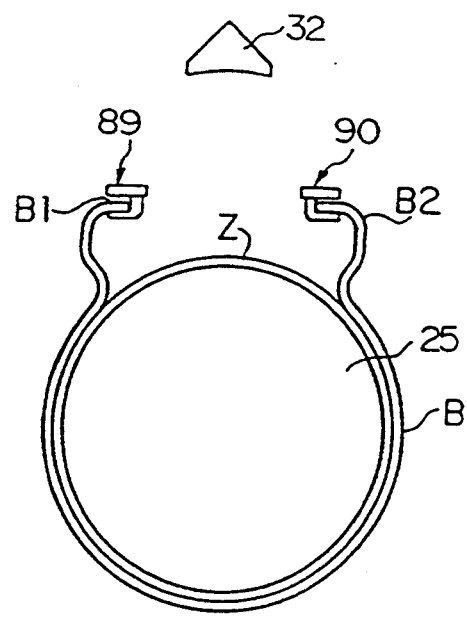
FIG. 10 is a schematic side elevational view illustrating a process in which the auxiliary bar is removed.

When the leading- and trailing-end gripping pawls 89 and 90 reach an intermediate position shown in FIG. 10 in the above-described manner, the cylinders 27 of the transfer unit 38 are actuated to project their piston rods 28, thereby lowering the grippers 29 down to the auxiliary bar 32. Then, the auxiliary bar 32 is gripped by the grippers 29, and the auxiliary bar 32 is demagnetized. The piston rods 28 of the cylinders 27 are then retracted to remove the auxiliary bar 32 off the forming drum 25 and raise the auxiliary bar 32 through the leading- and trailing-end gripping pawls 89 and 90 until it returns to its standby position.

Figure 11:
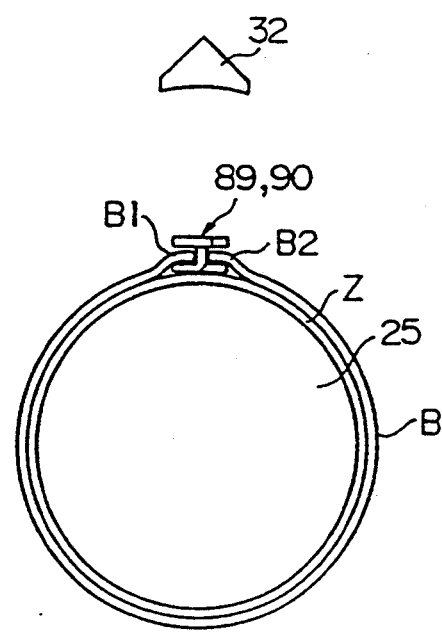
FIG. 11 is a schematic side elevational view illustrating a state in which leading and trailing ends of the belt-shaped member being gripped by the pawls are made to butt against each other.
Figure 12:
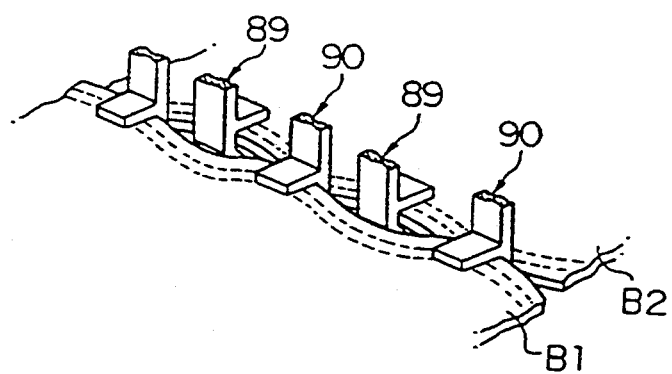
FIG. 12 is a perspective view illustrating a state in which the leading and trailing ends of the belt-shaped member are made to butt against each other.

Subsequently, the motor 49 of the moving unit 92 is operated to rotate the screw shaft 46, thereby allowing the moving bases 42 and 43 to approach each other. At the same time, the piston rods 23 of the cylinders 22 are projected to lower the movable frame 20. As a result, the leading-end gripping pawls 89 gripping the leading end B1 of the belt-shaped member B and the trailing-end gripping pawls 90 gripping the trailing end B2 thereof move up to the outer surface of the forming drum 25, specifically the outer surface of the belt-shaped member Z, while approaching each other, then enter each other, and cause the leading and trailing ends of the belt-shaped member B to butt against each other. Here, even if the leading and trailing ends of the belt-shaped member B are slightly bent before gripping, as described above, the leading and trailing ends B1 and B2 of the belt-shaped member B are respectively gripped by the leading- and trailing-end gripping pawls 89 and 90 in a state in which the leading and trailing ends of the belt-shaped member B abut against the vertical portions 75a and 76a of the lower pawls 75 and 76, respectively. Subsequently, as the piston rods 69 and 70 of the cylinders 67 and 68 project up to their stroke ends, the abutting portions of the leading and trailing ends of the belt-shaped member B are corrected to form a straight line, so that the leading and trailing ends of the belt-shaped member B are made to butt against each other with high accuracy. This state is shown in FIGS. 11 and 12. The leading and trailing ends B1 and B2 of this belt-shaped member B, as a whole, slightly undulate along the butt line L since their portions being gripped by the leading- and trailing-end gripping pawls 89 and 90 are made to float up slightly.

Then, the piston rods 79 and 80 of the cylinders 77 and 78 are retracted to open the leading- and trailing-end gripping pawls 89 and 90, so that the leading and trailing ends B1 and B2 of the belt-shaped member B are released from the leading- and trailing-end gripping pawls 89 and 90. The motor 49 of the moving unit 92 is then operated to rotate the screw shaft 46, which, in turn, causes the moving bases 42 and 43 to further approach each other, thereby allowing the leading- and trailing-end gripping pawls 89 and 90 to be released from the leading and trailing ends B1 and B2 of the belt-shaped member B. Subsequently, the piston rods 23 of the cylinders 22 are retracted to raise the movable frame 20 up to its initial position. At the same time, the motor 49 is operated to rotate the screw shaft 46, thereby allowing the moving bases 42 and 43 to return to their initial positions.

Then, as shown in FIG. 13, the joining roller 99 is rolled along the butt line L of the leading and trailing ends of the belt-shaped member B to press the leading and trailing ends B1 and B2 of the belt-shaped member B against the forming drum 25 so as to join the leading and trailing ends of the belt-shaped member B, thereby forming the cylindrical member.

Thus, since only the belt-shaped member B newly wound around the forming drum 25 is gripped and its leading and trailing ends are made to butt against each other, even if the belt-shaped member Z is already wound around the forming drum 25, no adverse effect is exerted on the lower belt-shaped member Z already wound, and it is possible to newly wind the belt-shaped member B around the forming drum 25 on which the belt-shaped member Z is already wound, and to butt join its both ends. It goes without saying that in a case where no belt-shaped member has been wound around the forming drum 25 and the belt-shaped member B is to be wound directly on the forming drum 25, it is possible to butt join its both ends. The above-described operation constitutes one cycle of operation in accordance with this embodiment of the invention, and this cycle is repeated thereafter to form cylindrical members consecutively.

As described above, in accordance with the present invention, it is possible not only to wind the belt-shaped member around the forming drum and butt join its both ends, but also to wind another belt-shaped member around the forming drum with a belt-shaped member already wound thereon and to butt join its both ends.

What is claimed is:

1. A method of forming a cylindrical member, comprising the steps of:
   attaching an auxiliary bar having a shape of a substantially triangular prism to a forming drum in such a manner that said auxiliary bar becomes parallel with an axis of said forming drum;
   supplying a belt-shaped member cut to a predetermined length toward said forming drum in such a manner as to cause a leading end of the belt-shaped member to be attached to one of side surfaces of said auxiliary bar;
   supplying the belt-shaped member onto said forming drum while said forming drum is being rotated so as to wind the belt-shaped member around said forming drum, and attaching a trailing end of the belt-shaped member to another side surface of said auxiliary bar;
   separating the leading end and the trailing end of the belt-shaped member from said auxiliary bar;
   removing said auxiliary bar off said forming drum; and
   causing the leading end and the trailing end of the belt-shaped member to butt against each other on said forming drum.

2. The method according to claim 1, wherein said auxiliary bar is attached to said forming drum by means of a magnetic force and is removed off said forming drum by demagnetizing said auxiliary bar.

3. The method according to claim 1, wherein the leading end and the trailing end of the belt-shaped member on said auxiliary bar are respectively gripped by a plurality of leading-end gripping pawls and trailing-end gripping pawls each having an upper pawl and a lower pawl.

4. The method according to claim 3, wherein said leading-end gripping pawls and said trailing-end gripping pawls are arranged alternately in a direction of the axis of said forming drum.

5. The method according to claim 3, wherein grooves into which said lower pawls of said leading-end gripping pawls and said trailing-end gripping pawls can be inserted are respectively formed on the two side surfaces of said auxiliary bar to which the belt-shaped member is to be attached, and when the leading end and the trailing end of the belt-shaped member are gripped on said auxiliary bar, said lower pawls are inserted into the grooves to allow the leading end and the trailing end to be easily gripped by said upper pawls and said lower pawls.

6. The method according to claim 1, wherein after said auxiliary bar is attached to said forming drum, said forming drum is rotated to cause said auxiliary bar to be located at a predetermined position, a distal end of a conveyor for transporting the belt-shaped member is brought into proximity to said auxiliary bar, the belt-shaped member is transported from said conveyor and is pressed against one of said side surfaces of said auxiliary bar so as to be attached to said side surface of said auxiliary bar.

7. The method according to claim 1, wherein after the leading end and the trailing end of the belt-shaped member are made to butt against each other on said forming drum, joining portions of the leading end and the trailing end of the belt-shaped member are pressed by a roller.

8. An apparatus for forming a cylindrical member comprising:
   a forming drum for forming a belt-shaped member cut to a predetermined length by winding the belt-shaped member therearound;
   an auxiliary bar having a shape of a substantially triangular prism and capable of being attached to or removed from said forming drum in parallel with an axis of said forming drum;
   transfer means for transferring said auxiliary bar to and away from a surface of said forming drum;
   belt-shaped member supplying means for supplying the belt-shaped member toward said forming drum with said auxiliary bar attached thereto to cause a leading end of the belt-shaped member to be attached to one of side surfaces of said auxiliary bar, and for further supplying the belt-shaped member onto said forming drum being rotated to cause the belt-shaped member to be wound around said forming drum and to cause a trailing end of the belt-shaped member to be attached to another side surface of said auxiliary bar;

belt-shaped member gripping means for holding and releasing the leading end and the trailing end of the belt-shaped member attached to said auxiliary bar; and moving means for moving said belt-shaped member gripping means in such a manner as to move the leading end and the trailing end of the belt-shaped member away from said auxiliary bar and to cause the leading end and the trailing end to butt against each other after said auxiliary bar is removed from said forming drum.

9. The apparatus according to claim 8, wherein said belt-shaped member gripping means includes a plurality of leading-end gripping pawls and trailing-end gripping pawls for respectively gripping the leading end and the trailing end of the belt-shaped member.

10. The apparatus according to claim 9, wherein said leading-end gripping pawls and said trailing-end gripping pawls are arranged alternately along the axis of said forming drum.

11. The apparatus according to claim 9, wherein said leading-end gripping pawls and said trailing-end gripping pawls are each provided with an upper pawl and a lower pawl which oppose each other, and an upper-pawl moving mechanism for gripping the end of the belt-shaped member between said upper pawl and said lower pawl by causing said upper pawl to approach said lower pawl.

12. The apparatus according to claim 8, wherein a surface of said auxiliary bar having the shape of the substantially triangular prism, which is attached to said forming drum, is formed with an arcuate surface having the same diameter as that of an outer surface of said forming drum.

13. The apparatus according to claim 8, wherein grooves each extending in a longitudinal direction of the belt-shaped member and into which said lower pawls of said leading-end gripping pawls and said trailing-end gripping pawls can be inserted are formed on two side surfaces of said auxiliary bar to which the belt-shaped member is to be attached, so as to facilitate the gripping of the belt-shaped member by said upper pawls and said lower pawls.

14. The apparatus according to claim 8, wherein a demagnetizable magnet is inserted in said auxiliary bar, and said transfer means has demagnetizing means.

15. The apparatus according to claim 8, wherein said transfer means has a pair of grippers capable of gripping or releasing longitudinal ends of said auxiliary bar.

16. The apparatus according to claim 8, wherein said belt-shaped member supplying means is a belt-shaped member transporting conveyor disposed such that the leading end of the belt-shaped member can be supplied to one of said side surfaces of said auxiliary bar attached to said forming drum, and the belt-shaped member supplied from said conveyor can be wound around said forming drum when said forming drum rotates.

17. The apparatus according to claim 8, further comprising a roller capable of rolling on joining portions of the leading end and the trailing end of the belt-shaped member made to butt against each other.

18. The apparatus according to claim 8, wherein said moving means includes a pair of opposed moving bases capable of moving toward or away from the axis of rotation of said forming drum and above said forming drum, and wherein said moving bases each have at a lower end thereof a swinging box which has a swinging axis parallel with the axis of rotation of said forming drum and by which said gripping means is held, to cause said gripping means to rotate about the swinging axis.

19. The apparatus according to claim 18, wherein said swinging box is provided with a base capable of extending said gripping means from said swinging box in such a manner as to allow said gripping means to move above and along a side surface of said auxiliary bar and a mechanism for moving said base.

20. An apparatus for forming a cylindrical member, comprising:

a forming drum for forming a belt-shaped member cut to a predetermined length by winding the belt-shaped member therearound;

an auxiliary bar having a shape of a substantially triangular prism and capable of being attached to or removed from said forming drum in parallel with an axis of said forming drum;

transfer means for transferring said auxiliary bar to and away from a surface of said forming drum;

belt-shaped member supplying means for supplying the belt-shaped member toward said forming drum with said auxiliary bar attached thereto to cause a leading end of the belt-shaped member to be attached to one of side surfaces of said auxiliary bar, and for further supplying the belt-shaped member onto said forming drum being rotated to cause the belt-shaped member to be wound around said forming drum and to cause a trailing end of the belt-shaped member to be attached to another side surface of said auxiliary bar;

belt-shaped member gripping means including a plurality of leading-end gripping pawls and trailing-end gripping pawls for holding and releasing the leading end and the trailing end of the belt-shaped member attached to said auxiliary bar, said leading-end gripping pawls and trailing-end gripping pawls being arranged alternately along the axis of said forming drum, each of said leading-end gripping pawls and trailing-end gripping pawls including an upper pawl and a lower pawl which oppose each other, and an upper moving mechanism for gripping the end of the belt-shaped member between said upper pawl and said lower pawl by causing said upper pawl to approach said lower pawl, and grooves into which said lower pawls can be inserted being formed on the side surfaces of said auxiliary bar attached to said forming drum; and moving means for moving said belt-shaped member gripping means in such a manner as to move the leading end and the trailing end of the belt-shaped member away from said auxiliary bar and to cause the leading end and the trailing end to butt against each other after said auxiliary bar is removed from said forming drum.

* * * * *